(12) United States Patent
Tamori

(10) Patent No.: US 11,873,007 B2
(45) Date of Patent: Jan. 16, 2024

(54) INFORMATION PROCESSING APPARATUS, INFORMATION PROCESSING METHOD, AND PROGRAM

(71) Applicant: Sony Group Corporation, Tokyo (JP)

(72) Inventor: Masahiro Tamori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 314 days.

(21) Appl. No.: 17/283,025

(22) PCT Filed: Oct. 30, 2019

(86) PCT No.: PCT/JP2019/042492
§ 371 (c)(1),
(2) Date: Apr. 6, 2021

(87) PCT Pub. No.: WO2020/100585
PCT Pub. Date: May 22, 2020

(65) Prior Publication Data
US 2021/0339770 A1    Nov. 4, 2021

(30) Foreign Application Priority Data
Nov. 13, 2018  (JP) .................................. 2018-212728

(51) Int. Cl.
*B60W 60/00* (2020.01)
*G06T 7/70* (2017.01)
(Continued)

(52) U.S. Cl.
CPC ...... *B60W 60/0015* (2020.02); *B60W 30/143* (2013.01); *B60W 30/18163* (2013.01);
(Continued)

(58) Field of Classification Search
CPC ........... B60W 60/0015; B60W 30/143; B60W 30/18163; B60W 40/08; B60W 2540/225;
(Continued)

(56) References Cited

U.S. PATENT DOCUMENTS

| 2004/0150514 | A1* | 8/2004 | Newman | ................ B60Q 9/008 345/7 |
| 2009/0167516 | A1 | 7/2009 | Kogawara | |

(Continued)

FOREIGN PATENT DOCUMENTS

| CN | 105083291 A | 11/2015 |
| CN | 105723435 A | 6/2016 |

(Continued)

*Primary Examiner* — Hussein Elchanti
(74) *Attorney, Agent, or Firm* — XSENSUS LLP

(57) ABSTRACT

The present disclosure relates to an information processing apparatus, an information processing method, and a program for ensuring safety when a line-of-sight direction of a driver is inappropriate according to a driving situation.
The line-of-sight direction of the driver of a vehicle is detected, whether or not the detected line-of-sight direction is a safe line-of-sight direction is determined, and in a case where the line-of-sight direction is determined not to be the safe line-of-sight direction, the vehicle is controlled to a safe state. The present disclosure can be applied to an in-vehicle system.

9 Claims, 7 Drawing Sheets

(51) Int. Cl.
- *B60W 30/14* (2006.01)
- *B60W 30/18* (2012.01)
- *B60W 40/08* (2012.01)
- *G08G 1/16* (2006.01)
- *G06V 20/56* (2022.01)

(52) U.S. Cl.
CPC ............. *B60W 40/08* (2013.01); *G06T 7/70* (2017.01); *G06V 20/56* (2022.01); *G08G 1/16* (2013.01); *B60W 2540/225* (2020.02); *B60W 2552/53* (2020.02); *G06T 2207/30201* (2013.01); *G06T 2207/30268* (2013.01)

(58) Field of Classification Search
CPC ............. B60W 2552/53; G06T 7/70; G06T 2207/30201; G06T 2207/30268; G06V 20/56; G08G 1/16
See application file for complete search history.

(56) References Cited

U.S. PATENT DOCUMENTS

| | | | |
|---|---|---|---|
| 2014/0125474 A1* | 5/2014 | Gunaratne | B60Q 9/008 340/439 |
| 2015/0232030 A1* | 8/2015 | Bongwald | B60R 1/00 348/115 |
| 2016/0304126 A1* | 10/2016 | Yamaoka | B60K 35/00 |
| 2016/0378112 A1* | 12/2016 | Ljubuncic | B60W 30/16 701/45 |
| 2018/0120837 A1 | 5/2018 | Regmi et al. | |
| 2018/0236985 A1* | 8/2018 | Kim | G06F 16/2365 |
| 2019/0202477 A1* | 7/2019 | Kapuria | G06V 20/59 |
| 2019/0300017 A1* | 10/2019 | Glaser | B60W 60/0053 |

FOREIGN PATENT DOCUMENTS

| | | |
|---|---|---|
| CN | 107000760 A | 8/2017 |
| DE | 11 2016 005 314 T5 | 8/2018 |
| JP | 2007-204032 A | 8/2007 |
| JP | 2009-157736 A | 7/2009 |
| JP | 2009-163434 A | 7/2009 |
| JP | 2016-34810 A | 3/2016 |
| JP | 2016-521424 A | 7/2016 |
| JP | 2017-100562 A | 6/2017 |
| JP | 2018-97515 A | 6/2018 |
| JP | 2018-133032 A | 8/2018 |
| JP | 2018-151900 A | 9/2018 |
| WO | 2017/145549 A1 | 8/2017 |

* cited by examiner

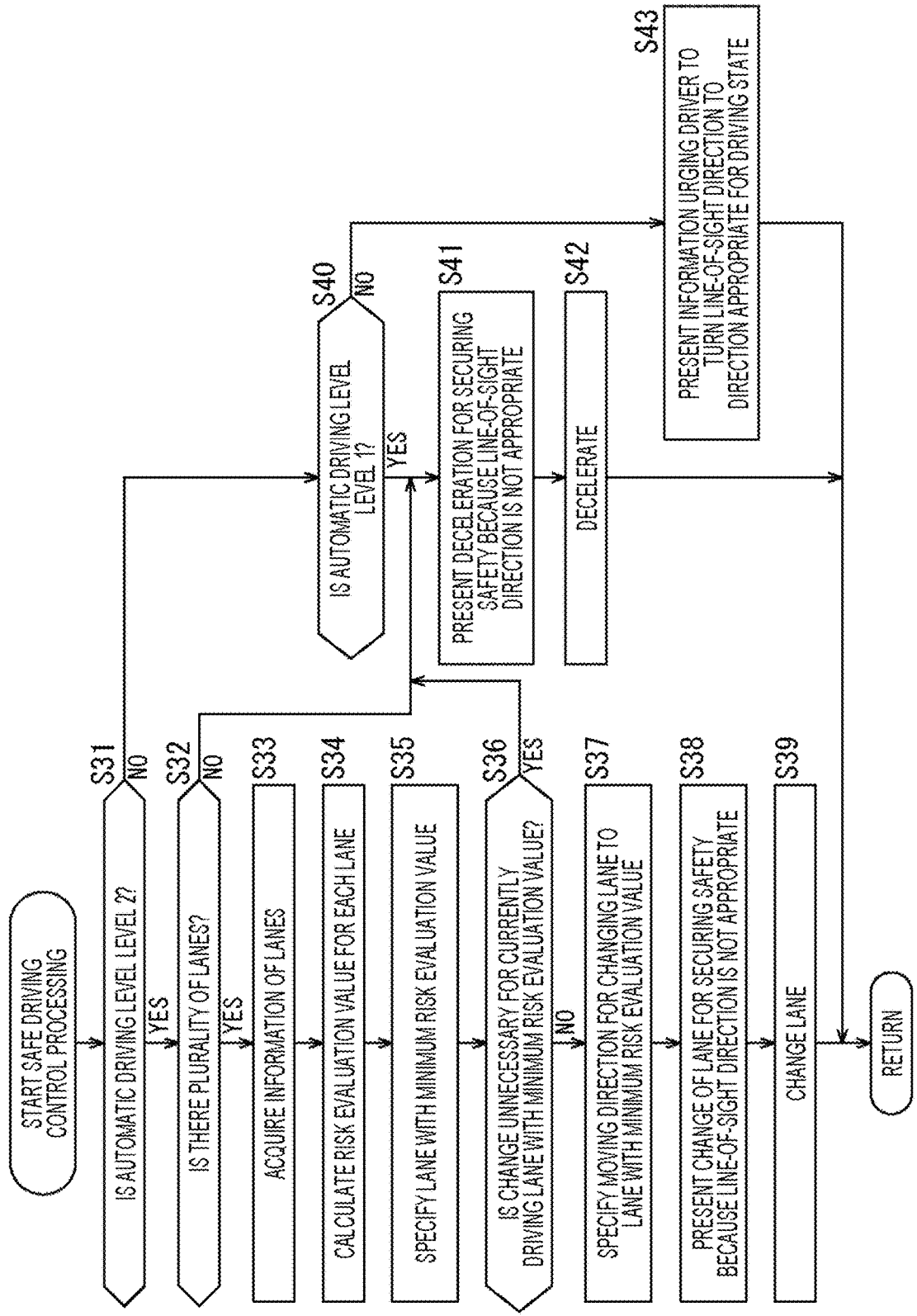

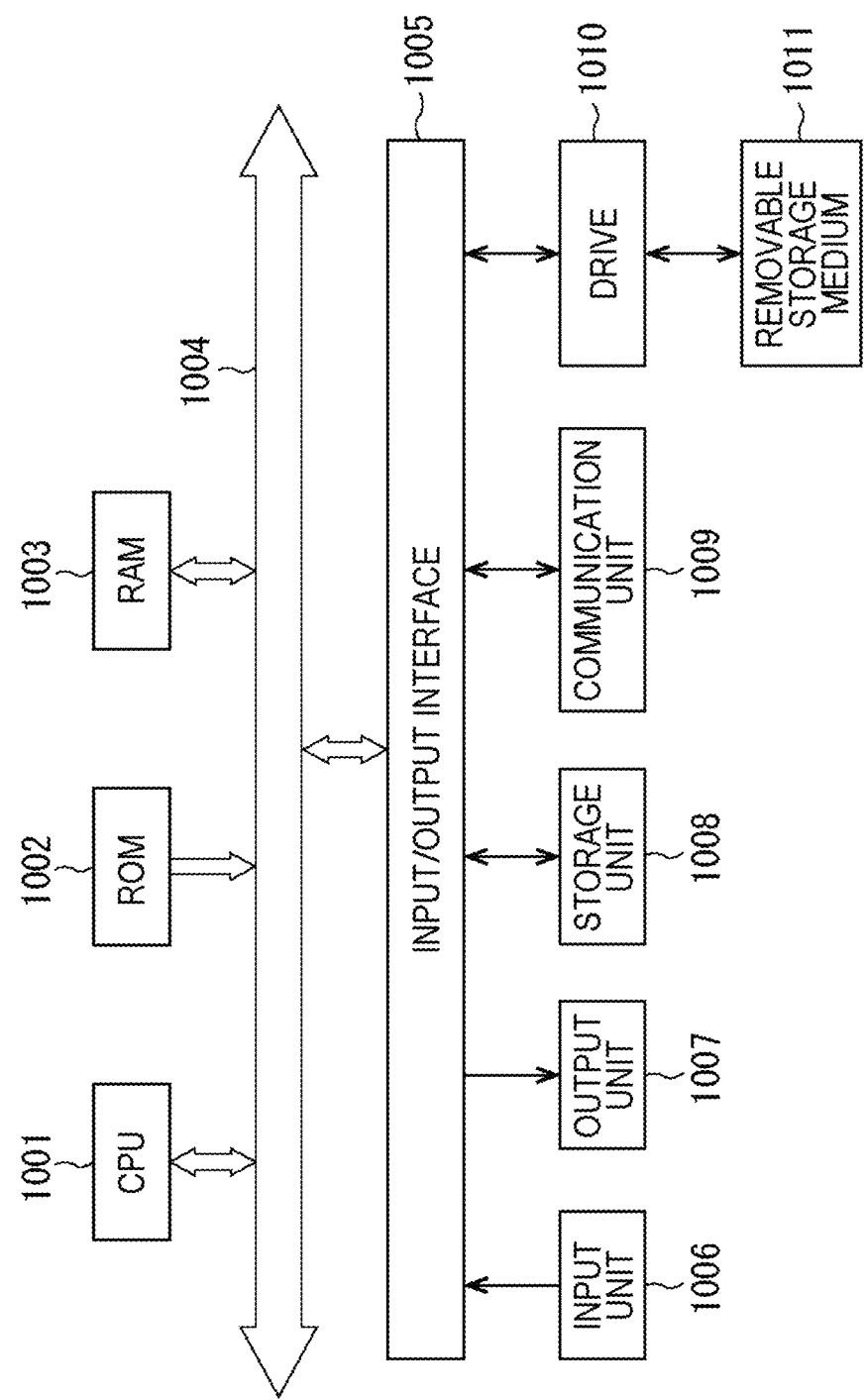

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2019/042492, filed Oct. 30, 2019, which claims priority to JP 2018-212728, filed Nov. 13, 2018, the entire contents of each are incorporated herein by reference.

TECHNICAL FIELD

The present disclosure relates to an information processing apparatus, an information processing method, and a program, and in particular relates to an information processing apparatus, an information processing method, and a program for ensuring safety when a line-of-sight direction of a driver is inappropriate for a driving state.

BACKGROUND ART

Driving assistance technologies that detect surrounding information and assist a driver in driving a vehicle, and automatic driving technologies that automatically control driving have attracted attention.

Among the technologies, a technology that detects a line-of-sight of a driver and determines whether or not to accept a driving operation by the driver on the basis of whether or not a change in a line-of-sight direction is appropriate has been proposed as a driving assistance technology that assists driving (see Patent Document 1).

CITATION LIST

Patent Document

Patent Document 1: Japanese Patent Application Laid-Open No. 2017-100562

SUMMARY OF THE INVENTION

Problems to be Solved by the Invention

However, in the technology of Patent Document 1, in a case where the vehicle is traveling straight, for example, the driving is not controlled even if the line-of-sight direction being an inappropriate direction is detected due to inattentive driving or dozing driving, for example, with respect to the driving state of traveling straight that has already been accepted.

The present disclosure has been made in view of the foregoing, and in particular implements driving control for ensuring safety on the basis of whether or not the line-of-sight direction is appropriate for the driving state.

Solutions to Problems

An information processing apparatus according to one aspect of the present disclosure is an information processing apparatus including a line-of-sight direction detection unit configured to detect a line-of-sight direction of a driver of a vehicle, and an operation control unit configured to control the vehicle to a safe state in a case where the line-of-sight direction is not a safe line-of-sight direction that is a direction the driver should face during driving.

An information processing method and a program according to one aspect of the present disclosure correspond to the information processing apparatus.

In one aspect of the present disclosure, a line-of-sight direction of a driver of a vehicle is detected, and the vehicle is controlled to a safe state in a case where the line-of-sight direction is not a safe line-of-sight direction that is a direction the driver should face during driving.

BRIEF DESCRIPTION OF DRAWINGS

FIG. 7 is a flowchart illustrating safe driving control processing.

FIG. 8 is a diagram illustrating a configuration example of a general-purpose computer.

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Hereinafter, modes for carrying out the present technology will be described. Description will be given in the following order.

1. Outline of Present Disclosure
2. Configuration Example of Vehicle Control System That Controls Vehicle of Present Disclosure
3. Configuration to Implement Driving Control for Ensuring Safety According to Line-of-sight Direction
4. Automatic Driving Control Processing
5. Safe Driving Control Processing
6. Example of Execution by Software

1. Outline of Present Disclosure

<Detection of Line-of-sight Direction>

An outline of the present disclosure will be described.

A vehicle of the present disclosure detects a line-of-sight direction of a driver and performs driving control for ensuring safety on the basis of whether or not the line-of-sight direction is an appropriate line-of-sight direction.

Figure 1:
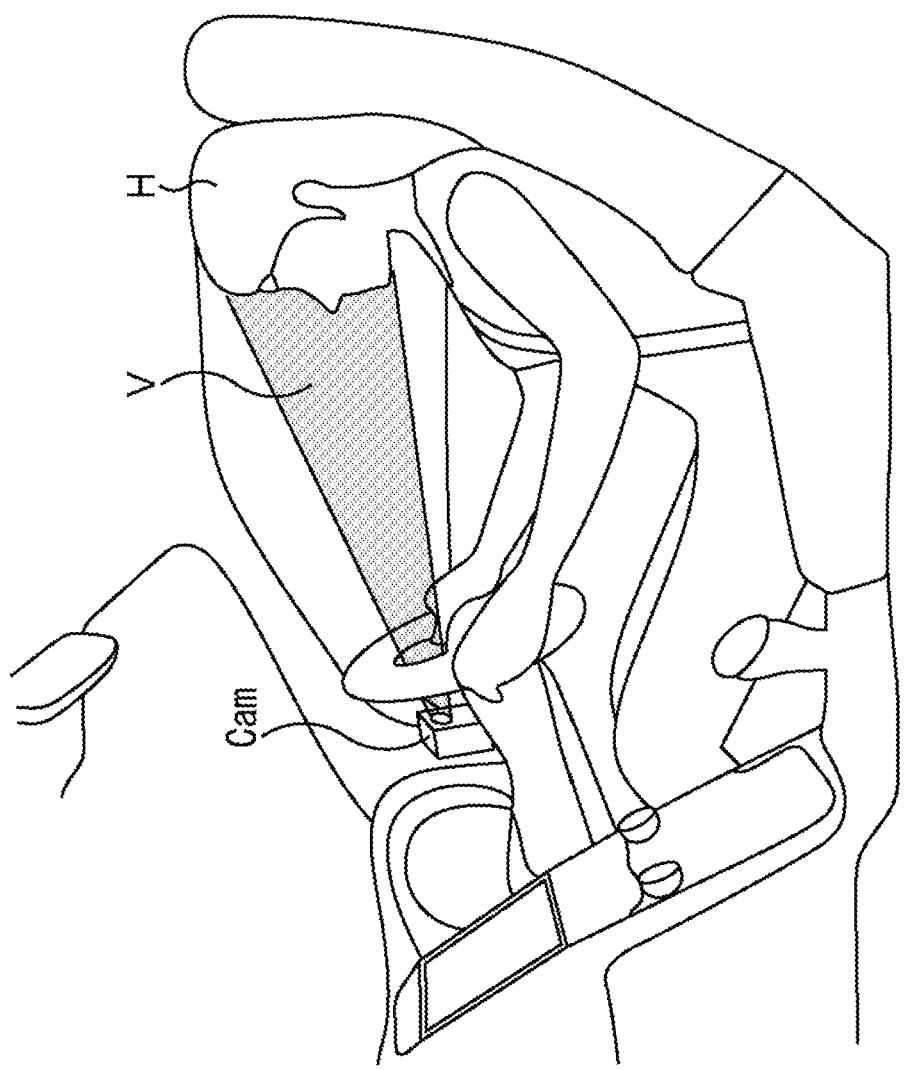
FIG. 1 is a diagram illustrating a configuration to detect a line-of-sight direction.

The line-of-sight direction is detected by capturing a range V near the face of a driver H using a camera Cam provided in an upper part of a steering and at a position facing the driver H, and on the basis of the position of a pupil of the driver in the captured image, as illustrated in FIG. 1.

The camera Cam desirably includes not only a so-called image sensor but also a time of flight (ToF) sensor.

More specifically, in the case of an image obtained by the image sensor, there is a possibility that the entire face is exposed to strong light by headlights of an oncoming vehicle at night, for example, and the image of the entire face is overexposed and each organ forming the face may not be able to be recognized.

In contrast, in the case of a distance image obtained by the ToF sensor, information of a distance from the camera Cam to each position on a surface of the face is obtained, and unevenness of the surface of the face can be recognized. Therefore, each organ forming the face can be recognized on the basis of information of the unevenness of the surface of the face.

For this reason, it is desirable that the camera Cam has the configuration provided with the image sensor and the ToF sensor, and uses the image by the image sensor and the distance image by the ToF sensor depending on a situation. Furthermore, by combining the image sensor and the ToF sensor, robustness may be improved or a processing time may be shortened.

<Driving Control According to Automatic Driving Level>

The vehicle of the present disclosure is premised on being driven by the driver and is premised on a vehicle adopting an automatic driving technology of automatic driving level 2 or lower, but can be applied to a vehicle at automatic driving level 3 or higher.

Here, the automatic driving level classifies a level of the automatic driving, and is classified into, for example, levels 0 to 5.

Level 0 is an automatic driving level in which the driver performs all of driving operations, and is not substantially the automatic driving.

Level 1 is an automatic driving level in which either a driving operation related to acceleration or deceleration or a driving operation related to a steering operation among the driving operations is controlled.

Level 2 is an automatic driving level in which the driving operation related to acceleration or deceleration and the driving operation related to a steering operation among the driving operations are controlled in cooperation.

Level 3 is an automatic driving level in which all the driving operations are controlled in a specific place such as an expressway. Note that, at the level 3, it is premised that the driver performs the driving operation in an emergency.

Level 4 is an automatic driving level in which all the driving operations are controlled including in an emergency in a specific place such as an expressway.

Level 5 is an automatic driving level in which all the driving operations are controlled in all situations, and is a level that is so-called fully automatic driving.

As described above, the technology for implementing the automatic driving levels of the levels 0 to 2 is generally called driving assistance technology because it is the technology in which the driver mainly performs the driving operations.

In contrast, the technology for implementing the automatic driving levels of the levels 3 to 5 is generally called automatic driving technology because it is the technology in which the driver becomes free from mainly performing the driving operations in a specific place.

The driving control of the present disclosure controls a driving operation for ensuring safety on the basis of whether or not the line-of-sight direction is appropriate according to a driving state, for the vehicle that implements automatic driving at the automatic driving levels 0 to 2, that is, the vehicle to which the driving assistance technology is applied.

More specifically, in the case of the automatic driving level 0, the driving is substantially not the automatic driving, as described above, and the driving operation is not controlled. Therefore, the line-of-sight direction being inappropriate is fed back (presented) to the driver, and improvement of the line-of-sight direction is urged.

Furthermore, in the case of the automatic driving level 1, for example when the line-of-sight direction detected in traveling straight ahead is not front ahead, inattentive driving or dozing driving is suspected, and thus the line-of-sight direction is deemed not to be appropriate.

In such a case, the line-of-sight direction being inappropriate is fed back (presented) to the driver, and improvement of the line-of-sight direction is urged. Moreover, when there is no improvement, the driving operation is controlled to decelerate the vehicle by a presented speed, as illustrated in FIG. 2.

By decelerating the vehicle in this way, safety can be ensured by delaying occurrence of an accident caused by inattentive driving, dozing driving, or the like, and reducing a damage level in the event of an accident.

Figure 2:
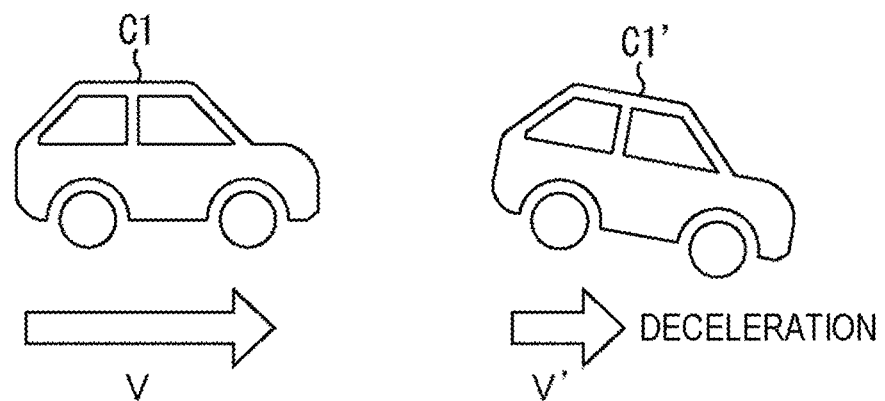
FIG. 2 is a diagram illustrating an example of safe driving control by deceleration when the line-of-sight direction is inappropriate in a case of automatic driving level 1.

Note that FIG. 2 illustrates, on the left side, a vehicle C1 is traveling straight ahead at a traveling speed V. Furthermore, FIG. 2 illustrates that, on the right side, in the traveling state of the vehicle C1, the line-of-sight direction is deemed to be inappropriate and improvement of the line-of-sight direction is urged, then when there is no improvement, the traveling speed is decelerated and a vehicle C1' is traveling at a traveling speed V' (<V).

Figure 3:
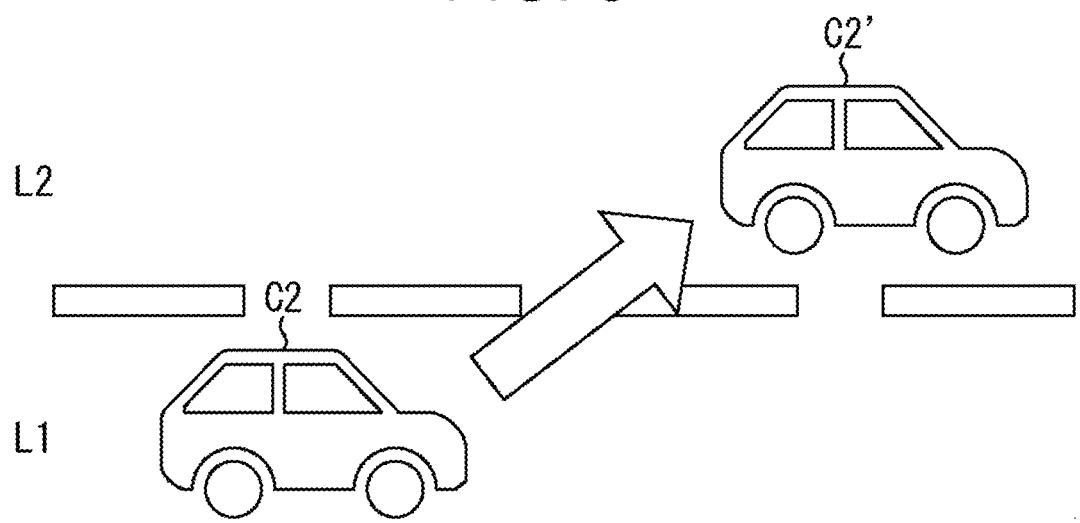
FIG. 3 is a diagram illustrating an example of safe driving control by lane change when the line-of-sight direction is inappropriate in a case of automatic driving level 2.

Moreover, in the case of the automatic driving level 2, the line-of-sight direction is inappropriate and the inattentive driving or dozing driving is suspected, and improvement of the line-of-sight direction is urged, then when there is no improvement, the driving operation is controlled to change the line to a safer driving lane, as illustrated in FIG. 3.

By changing the currently traveling lane to the safer lane, safety can be ensured by delaying occurrence of an accident caused by the inattentive driving, dozing driving, or the like, and reducing a damage level in the event of an accident.

Note that FIG. 3 illustrates that, on the left side, a vehicle C2 is traveling in a fast lane L1, and on the right side, a vehicle C2' is traveling in a state where the lane is changed to a safer driving lane L2 as a result of the line-of-sight deemed to be inappropriate.

2. Configuration Example of Vehicle Control System That Controls Vehicle of Present Disclosure Next, a vehicle control system of the vehicle of the present disclosure will be described with reference to the block diagram in FIG. 4

Figure 4:
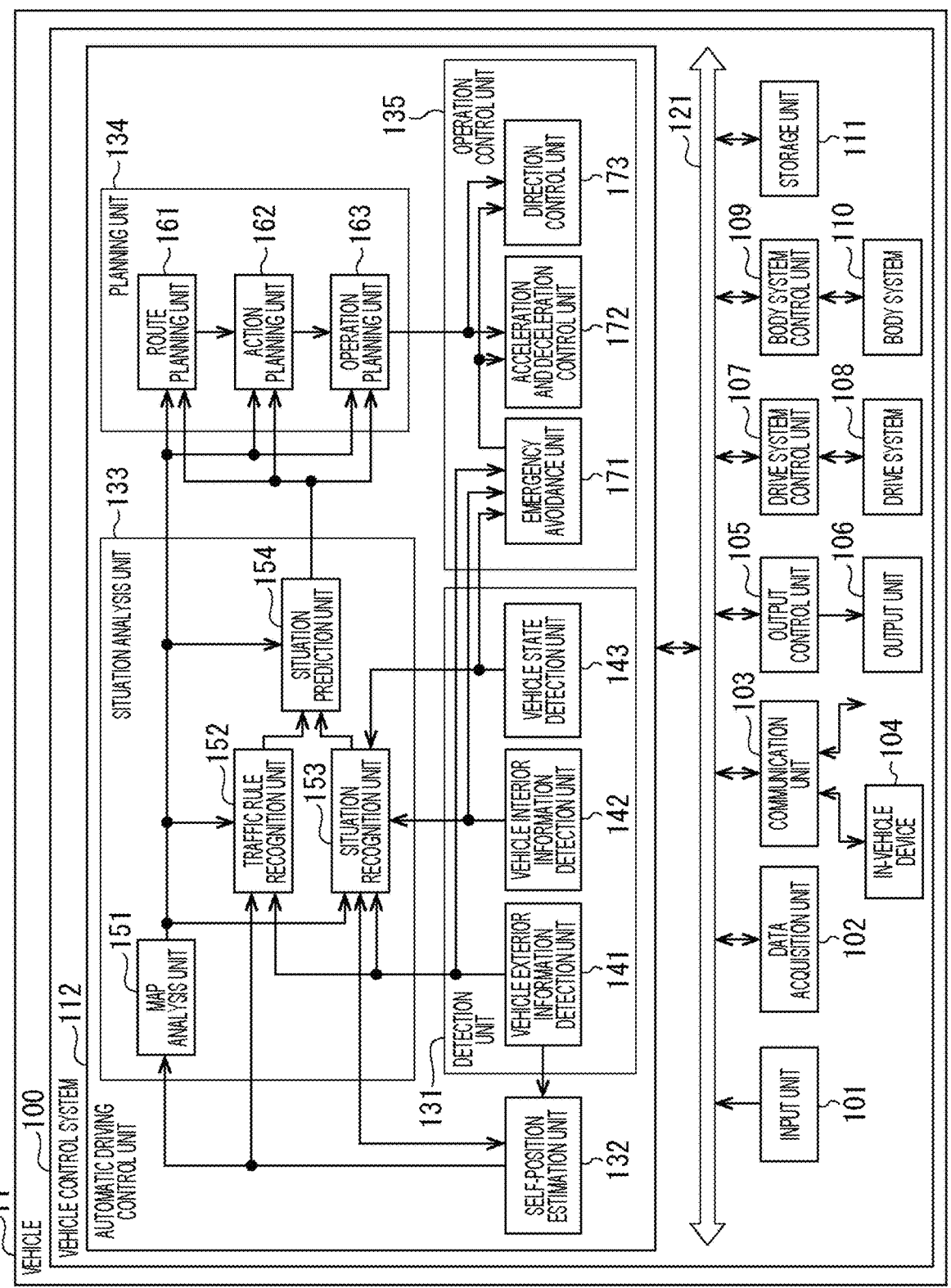
FIG. 4 is a block diagram illustrating a configuration example of a vehicle control system of the present disclosure.

FIG. 4 is a block diagram illustrating a configuration example of schematic functions of a vehicle control system 100 of a vehicle 11 to which the present technology can be applied.

Note that, hereinafter, in a case of distinguishing the vehicle 11 provided with the vehicle control system 100 from other vehicles, the vehicle 11 will be referred to as user's car or user's vehicle.

The vehicle control system 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an on-board communication network conforming to an arbitrary standard such as a controller area network (CAN), a local interconnect network (LIN), a local area network (LAN), or FlexRay (registered trademark), a bus, and the like. Note that the units of the vehicle control system 100 may be directly connected without the communication network 121.

Note that, hereinafter, the case where the units of the vehicle control system 100 perform communication via the communication network 121, the description of the communication network 121 is omitted. For example, the case where the input unit 101 and the automatic driving control unit 112 perform communication via the communication network 121 will be simply described as the input unit 101 and the automatic driving control unit 112 performing communication.

The input unit 101 includes a device used by a passenger to input various data, instructions, and the like. For example, the input unit 101 includes operation devices such as a touch panel, a button, a microphone, a switch, and a lever, an operation device capable of inputting data, instructions, and the like by a method other than a manual operation, such as voice or gesture, and the like. Furthermore, for example, the input unit 101 may be a remote control device using infrared rays or other radio waves, or an externally connected device such as a mobile device or a wearable device corresponding to the operation of the vehicle control system 100. The input unit 101 generates an input signal on the basis of the data, instructions, and the like input by the passenger, and supplies the input signal to each unit of the vehicle control system 100.

The data acquisition unit 102 includes various sensors and the like that acquire data to be used for the processing of the vehicle control system 100, and supplies the acquired data to each unit of the vehicle control system 100.

For example, the data acquisition unit 102 includes various sensors for detecting the state of the user's car and the like. Specifically, for example, the data acquisition unit 102 includes a gyro sensor, an acceleration sensor, an inertial measurement device (IMU), sensors for detecting an operation amount of an accelerator pedal, an operation amount of a brake pedal, a steering angle of a steering wheel, an engine speed, a motor speed, a rotation speed of wheels, or the like, and the like.

Furthermore, for example, the data acquisition unit 102 includes various sensors for detecting information outside the user's car. Specifically, for example, the data acquisition unit 102 includes imaging devices such as a time of flight (ToF) camera, a stereo camera, a monocular camera, an infrared camera, and other cameras. Furthermore, for example, the data acquisition unit 102 includes an environment sensor for detecting a weather, a meteorological phenomenon, or the like, and an ambient information detection sensor for detecting an object around the user's car. The environment sensor includes, for example, a raindrop sensor, a fog sensor, a sunshine sensor, a snow sensor, and the like. The ambient information detection sensor includes, for example, an ultrasonic sensor, a radar device, a light detection and ranging or laser imaging detection and ranging (LiDAR) device, a sonar, or the like.

Moreover, the data acquisition unit 102 includes, for example, various sensors for detecting a current position of the user's car. Specifically, for example, the data acquisition unit 102 includes a global navigation satellite system (GNSS) receiver that receives a GNSS signal from a GNSS satellite.

Furthermore, for example, the data acquisition unit 102 includes various sensors for detecting information inside the vehicle. Specifically, for example, the data acquisition unit 102 includes imaging devices (time of flight (ToF) camera, stereo camera, monocular camera, infrared camera, other cameras, and the like) that image the driver, a biometric sensor that detects the biometric information of the driver, a microphone that collects sound in the vehicle, and the like. The biometric sensor is provided, for example, on a seating surface, a steering wheel, or the like, and detects the biometric information of a passenger sitting on a seat or the driver holding the steering wheel.

The communication unit 103 communicates with the in-vehicle device 104 and various devices outside the vehicle, a server, a base station, and the like, transmits data supplied from each unit of the vehicle control system 100, and supplies received data to each unit of the vehicle control system 100. Note that a communication protocol supported by the communication unit 103 is not especially limited, and the communication unit 103 can support a plurality of types of communication protocols.

For example, the communication unit 103 performs wireless communication with the in-vehicle device 104, using a wireless LAN, Bluetooth (registered trademark), near field communication (NFC), a wireless USB (WUSB), or the like. Furthermore, for example, the communication unit 103 performs wired communication with the in-vehicle device 104, using a universal serial bus (USB), a high-definition multimedia interface (HDMI), a mobile high-definition link (MHL), or the like via a connection terminal (not illustrated) (and a cable if necessary).

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal (for example, a terminal of a pedestrian or a shop, or a machine type communication (MTC) terminal) existing in the vicinity of the user's car, using a peer to peer (P2P) technology. Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon reception unit, and receives a radio wave or an electromagnetic wave transmitted from a wireless station or the like installed on a road, and acquires information such as a current position, congestion, traffic regulation, or required time. Moreover, the communication unit 103 is controlled by an E-call 203 (FIG. 5) to be described below and transmits an occurrence position (GPS coordinates) where an accident has occurred to a center located on an external network and which contacts with a police station, a hospital, or the like in conjunction with an operating state of a sensor that detects a collision of an airbag or the like.

The in-vehicle device 104 includes, for example, a mobile device or a wearable device of a passenger, an information device carried in or attached to the user's vehicle, a navigation device for searching for a route to an arbitrary destination, and the like.

The output control unit 105 controls output of various types of information to the passenger of the user's car or to the outside of the vehicle. The output control unit 105 controls output of visual information (for example, image data) and auditory information (for example, sound data) from the output unit 106 by generating an output signal including at least one of the visual information or the auditory information and supplying the output signal to the output unit 106, for example. Specifically, for example, the output control unit 105 synthesizes image data captured by different imaging devices of the data acquisition unit 102 to generate a bird's-eye view image, a panoramic image, or the like, and supplies an output signal including the generated image to the output unit 106. Furthermore, for example, the output control unit 105 generates sound data including a warning sound, a warning message, or the like for dangers of collision, contact, entry to a dangerous zone, or the like and supplies an output signal including the generated sound data to the output unit 106.

The output unit 106 includes a device capable of outputting the visual information or the auditory information to the passenger of the user's car or to the outside of the vehicle. For example, the output unit 106 includes a display device (including an information display unit 252 (FIG. 5)), an instrument panel, an audio speaker, headphones, a wearable device such as a glasses-type display worn by the passenger, a projector, a lamp, or the like. The display device included in the output unit 106 may be, for example, a head-up display (HUD), a transmission-type display, or a display for displaying the visual information in a field of view of the driver, such as a device having an augmented reality (AR) display function, in addition to a device having a normal display. Furthermore, the output unit 106 has a configuration having a feedback function to encourage arousal to direct the line-of-sight direction to an appropriate direction when the driver's line-of-sight direction is an inappropriate direction, and the inattentive driving or dozing driving is predicted, for example. Examples of the configuration having the feedback function include a device (information display unit 252 (FIG. 5) or the like) that displays visual information in a field of view of the driver, a speaker 253 (FIG. 5) that outputs sound, a conversation agent unit 254 (FIG. 5) that talks with the driver using a microphone and a speaker and determines whether or not the driver can normally talk, a mechanism that vibrates a seat belt, a mechanism that vibrates the steering wheel, a mechanism that vibrates the seat, and an irritating odor generation unit 251 (FIG. 5) that generates an irritating odor.

The drive system control unit 107 controls the drive system 108 by generating various control signals and supplying the control signals to the drive system 108. Furthermore, the drive system control unit 107 supplies a control signal to each unit other than the drive system 108 to issue notification of a control state of the drive system 108, or the like, as needed.

The drive system 108 includes various devices related to the drive system of the user's car. For example, the drive system 108 includes a drive force generation device for generating a drive force of an internal combustion engine or a drive motor, a drive force transmission mechanism for transmitting the drive force to the wheels, a steering mechanism for adjusting the steering angle, a braking device for generating a braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 and notifies a control state of the body system 110, or the like, as needed.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-precision map such as a dynamic map, a global map having less accuracy than the high-precision map but covering a large area, and a local map including information around the user's car.

The automatic driving control unit 112 performs control related to the automatic driving such as autonomous traveling or driving assist. Specifically, for example, the automatic driving control unit 112 performs cooperative control for the purpose of implementing an advanced driver assistance system (ADAS) function including collision avoidance or shock mitigation of the user's car, following travel based on a vehicular gap, vehicle speed maintaining travel, collision warning of the user's car, lane out warning of the user's car, and the like. Furthermore, for example, the automatic driving control unit 112 performs the cooperative control for the purpose of automatic driving and the like of autonomous travel without depending on an operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the user's car on the basis of data or signals from each unit of the vehicle control system 100. For example, the vehicle exterior information detection unit 141 performs detection processing, recognition processing, and tracking processing, for an object around the user's car, and processing of detecting a distance to the object. Objects to be detected include, for example, vehicles, people, obstacles, structures, roads, traffic lights, traffic signs, road markings, and the like. Furthermore, for example, the vehicle exterior information detection unit 141 performs processing of detecting an environment around the user's car. The surrounding environment to be detected includes, for example, weather, temperature, humidity, brightness, road surface condition, and the like. The vehicle exterior information detection unit 141 supplies data indicating results of the detection processing to the self-position estimation unit 132, a map analysis unit 151, a traffic rule recognition unit 152, and a situation recognition unit 153 of the situation analysis unit 133, and an emergency avoidance unit 171 and the like of the operation control unit 135.

The vehicle interior information detection unit 142 performs processing of detecting information inside the vehicle on the basis of data or signals from each unit of the vehicle control system 100. For example, the vehicle interior information detection unit 142 performs driver authentication processing and recognition processing, driver state detection processing, passenger detection processing, vehicle interior environment detection processing, and the like. The state of the driver to be detected includes, for example, a physical condition, an arousal level, a concentration level, a fatigue level, a line-of-sight direction, or the like. The environment in the vehicle to be detected includes, for example, temperature, humidity, brightness, odor, and the like.

The vehicle interior information detection unit 142 supplies data indicating results of the detection processing to the situation recognition unit 153 of the situation analysis unit 133, the emergency avoidance unit 171 of the operation control unit 135, and the like.

The vehicle state detection unit 143 performs processing of detecting the state of the user's car on the basis of data or signals from each unit of the vehicle control system 100. The state of the user's car to be detected includes, for example, a speed, an acceleration, a steering angle, presence or absence of abnormality, content of abnormality, a state of driving operation, position and tilt of a power seat, a state of door lock, a state of another in-vehicle device, or the like. The vehicle state detection unit 143 supplies data indicating results of the detection processing to the situation recognition unit 153 of the situation analysis unit 133, the emergency avoidance unit 171 of the operation control unit 135, and the like.

The self-position estimation unit 132 performs processing of estimating the position, posture, and the like of the user's car on the basis of the data or signals from the units of the vehicle control system 100 such as the vehicle exterior information detection unit 141 and the situation recognition unit 153 of the situation analysis unit 133. Furthermore, the self-position estimation unit 132 generates a local map (hereinafter referred to as self-position estimation map) to be used for estimating the self-position, as needed. The self-position estimation map is a high-precision map using a technology such as simultaneous localization and mapping (SLAM), or the like. The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the user's car and its surroundings. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111, using the data or signals from the units of the vehicle control system 100 such as the self-position estimation unit 132 and the vehicle exterior information detection unit 141, as needed, and builds a map including information necessary for automatic driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs processing of recognizing a traffic rule around the user's car on the basis of the data or signals from the units of the vehicle control system 100 such as the self-position estimation unit 132, the vehicle exterior information detection unit 141, and the map analysis unit 151. By the recognition processing, for example, the position and state of signals around the user's car, the content of traffic regulation around the user's car, a travelable lane, and the like are recognized. The traffic rule recognition unit 152 supplies data indicating a result of the recognition processing to the situation prediction unit 154 and the like.

The situation recognition unit 153 performs processing of recognizing the situation regarding the user's car on the basis of the data or signals from the units of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing a situation of the user's car, a situation around the user's car, a situation of the driver of the user's car, and the like. Furthermore, the situation recognition unit 153 generates a local map (hereinafter referred to as situation recognition map) used for recognizing the situation around the user's car, as needed. The situation recognition map is, for example, an occupancy grid map.

The situation of the user's car to be recognized includes, for example, the position, attitude, movement (for example, speed, acceleration, moving direction, and the like) of the user's car, and the presence or absence, content of abnormality, and the like. The situation around the user's car to be recognized includes, for example, types and positions of surrounding stationary objects, types of surrounding moving objects, positions and motions (for example, speed, acceleration, moving direction, and the like), configurations of surrounding roads and conditions of road surfaces, as well as surrounding weather, temperature, humidity, brightness, and the like. The state of the driver to be recognized includes, for example, physical condition, arousal level, concentration level, fatigue level, line-of-sight (line-of-sight direction) motion, driving operation, and the like.

The situation recognition unit 153 supplies the data indicating a result of the recognition processing (including the situation recognition map, as needed) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the user's car on the basis of the data or signals from the units of the vehicle control system 100 such as the map analysis unit 151, the traffic rule recognition unit 152, and the situation recognition unit 153. For example, the situation prediction unit 154 performs processing of predicting the situation of the user's car, the situation around the user's car, the situation of the driver, and the like.

The situation of the user's car to be predicted includes, for example, a behavior of the user's car, occurrence of abnormality, a travelable distance, and the like. The situation around the user's car to be predicted includes, for example, a behavior of a moving object around the user's car, a change in a signal state, a change in the environment such as weather, and the like. The situation of the driver to be predicted includes, for example, a behavior and physical conditions of the driver, and the like.

The situation prediction unit 154 supplies data indicating a result of the prediction processing together with the data from the traffic rule recognition unit 152 and the situation recognition unit 153 to the route planning unit 161, the action planning unit 162, the operation planning unit 163 of the planning unit 134, and the like.

The route planning unit 161 plans a route to a destination on the basis of the data or signals from the units of the vehicle control system 100 such as the map analysis unit 151 and the situation prediction unit 154. For example, the route planning unit 161 sets a route to a destination specified from a current position on the basis of the global map. Furthermore, for example, the route planning unit 161 appropriately changes the route on the basis of situations of congestion, accidents, traffic regulations, construction, and the like, the physical conditions of the driver, and the like. The route planning unit 161 supplies data indicating the planned route to the action planning unit 162 and the like.

The action planning unit 162 plans an action of the user's car for safely traveling in the route planned by the route planning unit 161 within a planned time on the basis of the data or signals from the units of the vehicle control system 100 such as the map analysis unit 151 and the situation prediction unit 154. For example, the action planning unit 162 makes a plan of starting, stopping, traveling directions (for example, forward, backward, turning left, turning right, turning, and the like), driving lane, traveling speed, passing, and the like. The action planning unit 162 supplies data indicating the planned action of the user's car to the operation planning unit 163 and the like.

The operation planning unit 163 plans an operation of the user's car for implementing the action planned by the action planning unit 162 on the basis of the data or signals from the units of the vehicle control system 100 such as the map analysis unit 151 and the situation prediction unit 154. For example, the operation planning unit 163 plans acceleration, deceleration, a traveling track, and the like. The operation planning unit 163 supplies data indicating the planned operation of the user's car to an acceleration and deceleration control unit 172 and a direction control unit 173 of the operation control unit 135, and the like.

The operation control unit 135 controls the operation of the user's car. The operation control unit 135 includes the emergency avoidance unit 171, the acceleration and deceleration control unit 172, and the direction control unit 173.

The emergency avoidance unit 171 performs processing of detecting an emergency situation such as collision, contact, entry into a dangerous zone, driver's abnormality, vehicle's abnormality, and the like on the basis of the detection results of the vehicle exterior information detection unit 141, the vehicle interior information detection unit 142, and the vehicle state detection unit 143. In a case where the emergency avoidance unit 171 detects occurrence of the emergency situation, the emergency avoidance unit 171 plans the operation of the user's car for avoiding the emergency situation, such as sudden stop or sharp turn. The emergency avoidance unit 171 supplies data indicating the planned operation of the user's car to the acceleration and deceleration control unit 172, the direction control unit 173, and the like.

The acceleration and deceleration control unit 172 performs acceleration and deceleration for implementing the operation of the user's car planned by the operation planning unit 163 or the emergency avoidance unit 171. For example, the acceleration and deceleration control unit 172 calculates a control target value of a drive force generation device or a braking device for implementing the planned acceleration, deceleration, or sudden stop, and supplies a control command indicating the calculated control target value to the drive system control unit 107.

The direction control unit 173 controls a direction for implementing the operation of the user's car planned by the operation planning unit 163 or the emergency avoidance unit 171. For example, the direction control unit 173 calculates a control target value of a steering mechanism for implementing the traveling track or sharp turn planned by the operation planning unit 163 or the emergency avoidance unit 171, and supplies a control command indicating the calculated control target value to the drive system control unit 107.

Figure 5:
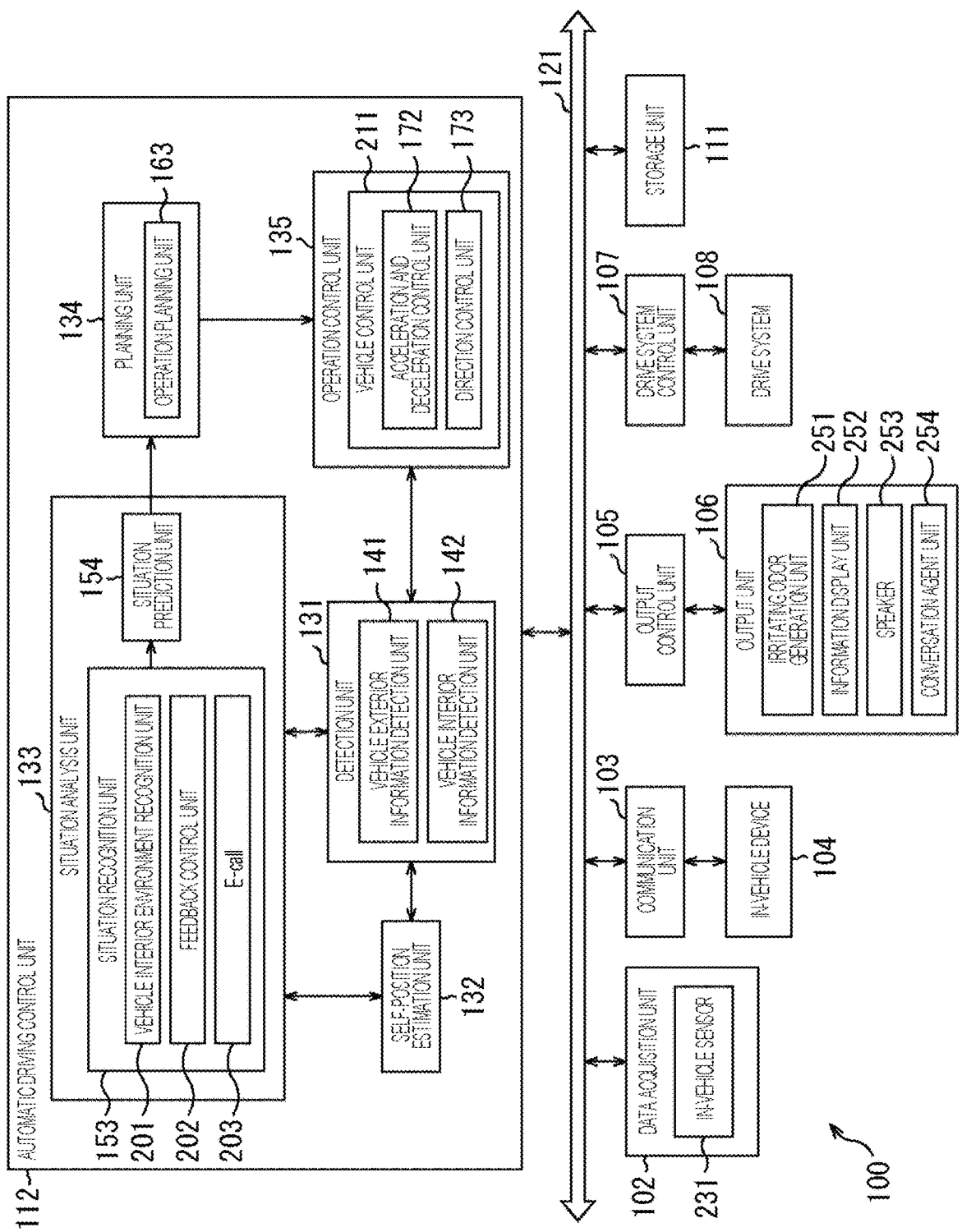
FIG. 5 is a block diagram illustrating a configuration example excerpting a configuration for implementing safe driving control in FIG. 4.

3. Configuration to Implement Driving Control for Ensuring Safety According to Line-of-Sight Direction Next, a configuration to implement driving control for ensuring safety according to the detected line-of-sight direction will be described with reference to the block diagram in FIG. 5. Note that FIG. 5 illustrates a configuration excerpting the configuration to implement the driving control for ensuring safety according to the detected line-of-sight direction, in the configuration example of the functions that implement the vehicle control system 100 described with reference to FIG. 4.

The data acquisition unit 102 includes an in-vehicle sensor 231 for detecting the line-of-sight. Specifically, the in-vehicle sensor 231 referred to here corresponds to the camera Cam having the functions of the image sensor and the ToF sensor (ToF camera) described with reference to FIG. 1.

That is, the in-vehicle sensor 231 acquires an image near the face of the driver H from the image acquired by the image sensor or the distance image acquired by the ToF sensor, and outputs the image to the vehicle interior information detection unit 142 of the detection unit 131 in the automatic driving control unit 112. The vehicle interior information detection unit 142 detects the line-of-sight direction of the driver H on the basis of the position of the pupil and the like in the image and outputs the line-of-sight direction to the situation recognition unit 153 of the situation analysis unit 133.

Furthermore, the vehicle exterior information detection unit 141 performs detection processing, recognition processing, and tracking processing for the object around the user's car, and distance detection processing to the object around the user's car supplied from the data acquisition unit 102, generates vehicle peripheral information at the timing when the line-of-sight direction has been detected on the basis of processing results, and outputs the vehicle peripheral information to the situation recognition unit 153 of the situation analysis unit 133.

The situation recognition unit 153 includes, as the configuration to implement the driving control according to the detected line-of-sight direction, a vehicle interior environment recognition unit 201, a feedback control unit 202, and an E-call control unit (E-call) 203.

The vehicle interior environment recognition unit 201 determines whether or not the line-of-sight direction of the driver in the vehicle is an appropriate direction for the driving situation (whether or not the driver is gazing at the appropriate line-of-sight direction for an appropriate time) on the basis of the vehicle peripheral information supplied from the vehicle exterior information detection unit 141 of the detection unit 131 and the line-of-sight direction information supplied from the vehicle interior information detection unit 142. Then, the vehicle interior environment recognition unit 201 outputs the determination result to the situation prediction unit 154 and the feedback control unit 202.

More specifically, the vehicle interior environment recognition unit 201 acquires, as the vehicle peripheral information, for example, the processing results of the detection processing, recognition processing, and tracking processing for the object around the user's car, and distance detection processing to the object, and the like, together with the line-of-sight direction information acquired by the in-vehicle sensor 231 of the detection unit 131.

Here, information of the object around the user's car include, for example, vehicles, people, obstacles, structures, roads, traffic lights, traffic signs, road markings, and the like. Furthermore, information of the environment around the user's car includes the weather, temperature, humidity, brightness, road surface condition, and the like.

Furthermore, the appropriate direction for the line-of-sight direction of the driver changes according to the driving situation (driving state).

For example, in the case of a driving situation in which the vehicle is traveling straight ahead on a road having a relatively high legal speed such as an expressway, the appropriate line-of-sight direction is the front ahead.

However, when the vehicle is traveling in a narrow alley with a lot of traffic, it is appropriate that the line-of-sight direction is directed to pedestrians walking on a shoulder of a road and the like, bicycles, and the like, and oncoming vehicles.

Furthermore, in the case of a driving situation of performing the driving operation of lane change, the appropriate line-of-sight direction has a time-series change of the line-of-sight direction required for safety, which is described in a general instructional book and the like for driving, such as the line-of-sight direction being moved from a rearview mirror to a door mirror, and finally directed to a lane to change. Furthermore, regarding the gazing time, gazing at the rearview mirror or the door mirror for more than a few seconds is not appropriate.

Note that, in a case where the door mirror and the rearview mirror are substituted by cameras that capture a visible range via the door mirror and the rearview mirror, the ranges in which images captured by the cameras provided in place of the door mirror and the rearview mirror are the appropriate line-of-sight directions corresponding to the directions of the door mirror and the rearview mirror.

The vehicle interior environment recognition unit 201 determines whether or not the line-of-sight direction of the driver is appropriate for the driving situation on the basis of the vehicle peripheral information and the line-of-sight direction information supplied from the detection unit 131, and outputs the determination result to the situation prediction unit 154.

Note that, hereinafter, the line-of-sight direction deemed to be appropriate for the driving state based on the vehicle peripheral information will be referred to as safe line-of-sight direction.

For example, in a case where the vehicle is recognized to be traveling on an expressway from the vehicle peripheral information, the line-of-sight direction of the driver is deemed to be the safe line-of-sight direction when the line-of-sight direction of the driver is directed to the front ahead.

Furthermore, for example, in a case where the vehicle is recognized to be traveling on a narrow alley with a lot of traffic from the vehicle peripheral information, the line-of-sight direction of the driver is deemed to be the safe line-of-sight direction when the line-of-sight direction of the driver is directed to passerby, bicycles, oncoming vehicles, or the like.

Moreover, for example, in a case where lane change or turning right or left is recognized such as an operation to turn on a blinker being performed from the vehicle peripheral information, the line-of-sight direction of the driver is deemed to be the safe line-of-sight direction when the line-of-sight direction of the driver is changed in a time series to a direction required at each timing such as the rearview mirror, the door mirror (regions where the images captured by the cameras are displayed in a case where the door mirror and the rearview mirror are cameras), the direction of a lane to change, or the direction of a road to turn right or left. Here, the direction (position) or order to be the line-of-sight direction changed in a time series may be a direction (position) or order described in an instructional book and the like regarding driving of an automobile, for example.

In this way, the safe line-of-sight direction changes according to the driving situation (driving state) recognized from the vehicle peripheral information.

The feedback control unit 202 causes the output unit 106 to give a feedback that urges the driver to direct the line-of-sight direction to the appropriate direction via the output control unit 105 in a case where the line-of-sight direction is not appropriate on the basis of the determination result supplied from the vehicle interior environment recognition unit 201.

That is, in a case where the line-of-sight direction is not appropriate, there is a possibility that the driver is performing dangerous driving such as inattentive driving or dozing driving. Therefore, the feedback control unit 202 gives the feedback for encouraging arousal to the driver to make the line-of-sight direction appropriate.

More specifically, the feedback control unit 202 gives the feedback to urge the driver to direct the line-of-sight direction to the appropriate direction by controlling the irritating odor generation unit 251 of the output unit 106 via the output control unit 105 to generate an irritating odor and irritate a sense of smell of the driver.

Furthermore, the feedback control unit 202 gives the feedback to urge the driver to direct the line-of-sight direction to the appropriate direction by controlling the information display unit 252 of the output unit 106 to present image information (including text, moving image, and the like) via the output control unit 105 to urge the line-of-sight direction to be directed to the appropriate line-of-sight direction because the line-of-sight direction is not appropriate.

Moreover, the feedback control unit 202 gives the feedback to urge the driver to direct the line-of-sight direction to the appropriate direction by controlling the speaker 253 of the output unit 106 to output sound via the output control unit 105 to urge the line-of-sight direction to be directed to the appropriate line-of-sight direction because the line-of-sight direction is not appropriate. The feedback control unit 202 gives the feedback to urge the driver to direct the line-of-sight direction to the appropriate direction by controlling the conversation agent unit 254 of the output unit 106 via the output control unit 105 to ask a question and cause the driver to answer the question to awaken the consciousness. The question to the driver is, for example, the driver's name, date of birth, or the like, and the feedback is given by asking the driver for a response, and encouraging the driver to awaken to direct the line-of-sight direction to the appropriate direction.

The feedback control unit 202 gives the feedback to urge the driver to direct the line-of-sight direction to the appropriate direction by at least one of the irritating odor generation unit 251, the information display unit 252, the speaker 253, or the conversation agent unit 254.

Note that the feedback may be given not only by the irritating odor generated by the irritating odor generation unit 251, the image displayed by the information display unit 252, the sound output by the speaker 253, and the conversation by the conversation agent unit 254, but also by another method as long as information for urging the driver to direct the line-of-sight direction to the appropriate direction can be presented.

More specific configurations for giving the feedback may include, for example, a head up display (HUD) that displays information urging the driver to direct the line-of-sight direction to an appropriate direction, a configuration that vibrates the seat belt, a configuration that vibrates the steering wheel, and a configuration that vibrates the seat.

When information of an impact or the like detected when a collision accident occurs is detected by the detection unit 131, the E-call control unit 203 acquires information of the self-position by the self-position estimation unit 132 and controls the communication unit 103 to notify information indicating that the accident has occurred including the information of the self-position to a center that reports occurrence of an accident to the police station, hospitals, and the like.

The situation prediction unit 154 predicts a situation from a vehicle interior environment by the driver on the basis of the determination result based on the line-of-sight direction supplied from the vehicle interior environment recognition unit 201, and outputs a command according to the prediction result to the operation planning unit 163 of the planning unit 134. More specifically, in a case where the line-of-sight direction is not appropriate, the situation prediction unit 154 predicts the possibility that the driver is in the dangerous driving state such as the inattentive driving or dozing driving, and transmits the command to the planning unit 134 to execute safe driving control processing on the basis of the prediction result.

The operation planning unit 163 of the planning unit 134 plans the operation for implementing the safe driving control processing according to the automatic driving level when the command for instructing the safe driving control processing is transmitted from the situation prediction unit 154.

More specifically, in a case where the automatic driving level is the level 2, the operation planning unit 163 controls the communication unit 103 to acquire lane information of the currently traveling road from a cloud server or the like when a plurality of lanes is present on the currently traveling road.

The lane information acquired here is a ratio of parked vehicles existing for each time in each lane, a ratio of loading/unloading of a surrounding facility for each time, traffic congestion prediction for each time, fast lane information for each time, and the like. The ratio of parked vehicles for each time in each lane includes a case where a certain lane is impassable due to an accident or the like. The fast lane information is information in a case where a plurality of lanes is present. The lane information includes a lane is a driving lane or a fast lane and how far away from the driving lane in the case of the fast lane, the legal speed of each lane, and the like.

The operation planning unit 163 calculates a risk evaluation value for each lane on the basis of the lane information by the following expression (1), for example.

$$S_x = P_t \times w_P + L_t \times w_L + T_t \times w_T + O_t \times w_O \quad (1)$$

Here, $S_x$ is the risk evaluation value of a lane x at time t, $P_t$ is the ratio of parked vehicles at the time t, and $w_P$ is a weight for the ratio of parked vehicles at the time t.

Furthermore, $L_t$ is the ratio of loading/unloading of a surrounding facility at the time t, and $w_L$ is a weight for the ratio of loading/unloading of a surrounding facility at the time t.

Moreover, $T_t$ is the traffic congestion prediction at the time t, and $w_T$ is a weight for the traffic congestion prediction at the time t.

Furthermore, $O_t$ is the fast lane information at the time t, and $w_O$ is a weight for the fast lane information at the time t.

The operation planning unit 163 calculates a current risk evaluation value $S_x$ for each of the plurality of lanes, and plans the driving operation for performing lane change to the safest lane, considering that a lane with the minimum risk evaluation value as the safest lane.

Furthermore, in a case where the lane with the minimum risk evaluation value is the currently traveling lane or a relatively narrow alley, or the number of lanes is one, the operation planning unit 163 plans the driving operation of performing control to reduce the current traveling speed by a predetermined rate.

In both the lane change and reduction of the traveling speed, time to delay occurrence of an accident caused by the inattentive driving or dozing driving is secured and a damage level in the event of an accident can be reduced, and the safe driving control can be implemented.

Furthermore, in a case where the automatic driving level is the level 1, the operation planning unit 163 plans the driving operation of reducing the current traveling speed by a predetermined rate.

Moreover, in a case where the automatic driving level is the level 0, all the driving operations are performed by the driver, and thus the driving operation is not planned. The operation planning unit 163 presents the information that urges improvement of the line-of-sight direction to the appropriate direction because the line-of-sight direction is not appropriate.

The operation planning unit 163 supplies the planned operation plan to the vehicle control unit 211 of the operation control unit 135.

The vehicle control unit 211 controls the acceleration and deceleration control unit 172 and the direction control unit 173 to control the operation of the vehicle according to the operation plan.

That is, the acceleration and deceleration control unit 172 controls the drive system 108 via the drive system control unit 107 to reduce the traveling speed by the predetermined rate corresponding to the operation plan when the operation plan of reducing the traveling speed is supplied.

Furthermore, the direction control unit 173 controls the direction to implement the lane change to the safest lane corresponding to the operation plan when the operation plan of changing lanes is supplied.

At this time, the operation planning unit 163 controls the information display unit 252 and the speaker 253 of the output unit 106 via the output control unit 105 to present information according to the planned operation plan by images and sound.

That is, in this case, the operation planning unit 163 controls the information display unit 252 and the speaker 253 of the output unit 106 via the output control unit 105 to present, to the driver, the information such as changing lanes or reducing the traveling speed by images and sound because the line-of-sight direction is not appropriate.

By presenting and notifying in advance that the safe driving control processing will change lanes or decelerate, it is possible to prevent the driver from being surprised by the sudden lane change or deceleration and prevent occurrence of an accident caused by careless driving operation even if the driver awakens just before the lane change or deceleration, for example.

4. Automatic Driving Control Processing

Figure 6:
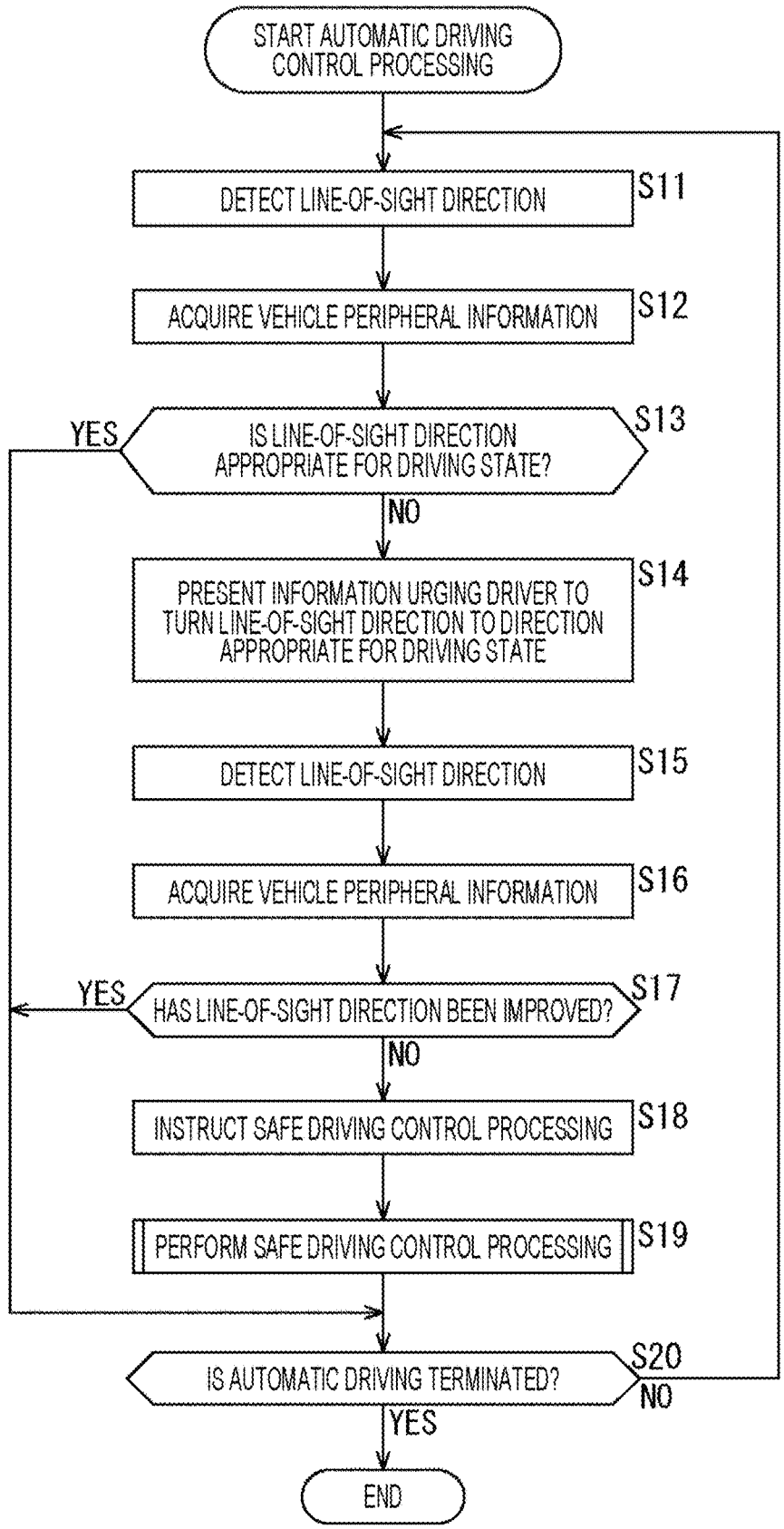
FIG. 6 is a flowchart illustrating automatic driving control processing.

Next, automatic driving control processing by the vehicle control system 100 in FIG. 5 will be described with reference to the flowchart in FIG. 6.

In step S11, the in-vehicle sensor 231 of the data acquisition unit 102 captures an image of a vicinity of the driver's face and outputs the captured image to the vehicle interior information detection unit 142 of the detection unit 131. The vehicle interior information detection unit 142 detects the driver's line-of-sight direction on the basis of the position of a driver's pupil in the captured image, and outputs the detected line-of-sight direction to the vehicle interior environment recognition unit 201 in the situation recognition unit 153. That is, the vehicle interior environment recognition unit 201 acquires information in the line-of-sight direction by the processing.

More specifically, the vehicle interior information detection unit 142 detects the position of the pupil of the driver on the basis of either the image captured by the image sensor or the distance image captured by the ToF sensor of the in-vehicle sensor 231, for example, and detects the line-of-sight direction of the driver according to the position of the pupil.

Furthermore, the vehicle interior information detection unit 142 may detect the line-of-sight direction from the image captured by the image sensor of the in-vehicle sensor 231 in a bright environment during daytime, and detect the line-of-sight direction on the basis of the distance image captured by the ToF sensor in a dark environment at night or in stormy weather, for example. Moreover, by combining the image sensor and the ToF sensor, the robustness may be improved or the processing time may be shortened.

In step S12, the data acquisition unit 102 detects information outside the vehicle by various sensors other than the in-vehicle sensor 231 and outputs the information to the vehicle exterior information detection unit 141 of the detection unit 131. The vehicle exterior information detection unit 141 acquires the information from the data acquisition unit 102, generates vehicle peripheral information, and outputs the vehicle peripheral information to the vehicle interior environment recognition unit 201 in the situation recognition unit 153. By the processing, the vehicle interior environment recognition unit 201 acquires the vehicle peripheral information.

In step S13, the vehicle interior environment recognition unit 201 determines whether or not the line-of-sight direction is appropriate for the driving situation on the basis of the information of the line-of-sight direction (including the gazing time of the line-of-sight) and the vehicle peripheral information.

As described above, in a case where the currently traveling road is an expressway or the like, and the vehicle is traveling straight ahead on the road, on the basis of the vehicle peripheral information, the front ahead is deemed to be the appropriate line-of-sight direction.

Furthermore, in a case where the vehicle is traveling in a narrow alley with a lot of traffic on the basis of the vehicle peripheral information, the line-of-sight direction to pedestrians walking on a shoulder of a road and the like, bicycles, and the like, and oncoming vehicles is deemed to be the appropriate line-of-sight direction.

Moreover, in the case of performing the driving operation of lane change on the basis of the vehicle peripheral information, the line-of-sight direction is deemed to be appropriate when there is a time-series change of the line-of-sight direction required for safety, which is described in a general instructional book and the like for driving, such as the line-of-sight direction being moved from the rearview mirror to the door mirror, and finally directed to the lane to change.

In step S13, in a case where it is determined that the line-of-sight direction (line-of-sight direction premised on an appropriate gazing time) is not appropriate according to the driving situation (including a case where the gazing time is not appropriate even if the line-of-sight direction is appropriate), the processing proceeds to step S14.

In step S14, in a case where the line-of-sight direction is not appropriate on the basis of the determination result supplied from the vehicle interior environment recognition unit 201, the feedback control unit 202 gives the feedback that urges the driver to direct the line-of-sight direction to the appropriate direction, using at least one of the irritating odor generation unit 251, the information display unit 252, or the speaker 253 of the output unit 106 via the output control unit 105.

In step S15, the vehicle interior environment recognition unit 201 acquires the line-of-sight direction information again in a similar manner to the processing in step S11.

In step S16, the vehicle interior environment recognition unit 201 acquires the vehicle peripheral information again in a similar manner to the processing in step S12.

In step S17, the vehicle interior environment recognition unit 201 determines whether or not the line-of-sight direction has been improved to the appropriate direction for the driving situation by the feedback from the feedback control unit 202.

In step S17, in a case where the line-of-sight direction is not improved to the appropriate direction for the driving situation, the processing proceeds to step S18.

In step S18, the vehicle interior environment recognition unit 201 outputs information indicating that the line-of-sight direction is not an appropriate direction for the driving situation and the vehicle peripheral information to the situation prediction unit 154. In a case where the line-of-sight direction is not appropriate, the situation prediction unit 154 predicts the possibility that the driver is performing dangerous driving such as the inattentive driving or dozing driving, and transmits the command to the operation planning unit 163 of the planning unit 134 to execute the safe driving control processing on the basis of the prediction result. At this time, the situation prediction unit 154 transmits the vehicle peripheral information together with the command for urging the safe driving control processing to the operation planning unit 163 of the planning unit 134.

In step S19, the operation planning unit 163 of the planning unit 134 executes the safe driving control processing for ensuring safety for the current driving situation on the basis of the command for executing the safe driving control processing and the vehicle peripheral information.

Note that details of the safe driving control processing will be described below with reference to the flowchart in FIG. 7.

When the safe driving control processing is performed by the processing in step S19 and the safety is ensured, the processing proceeds to step S20.

In step S20, the automatic driving control unit 112 determines whether or not termination of the automatic driving is instructed, and in a case where it is determined that the termination of the automatic driving is not instructed, the processing returns to step S11 and the subsequent processing is repeated. [0153]

Furthermore, in step S13, in a case where the line-of-sight direction is deemed to be the appropriate direction for the driving situation, the processing in steps S14 to S19 is skipped.

Moreover, in step S17, in a case where the line-of-sight direction is deemed to be the appropriate direction for the driving situation, the processing in steps S18 and S19 is skipped.

Then, in step S20, in a case where the termination of the automatic driving is instructed, the automatic driving processing is terminated.

By the above processing, whether or not the line-of-sight direction is appropriate for the driving situation is determined, and in a case where the line-of-sight direction is inappropriate, the processing of urging improvement of the line-of-sight direction is performed, and in a case where improvement is not performed, the safe driving control processing is executed, whereby the safety is ensured.

5. Safe Driving Control Processing

Next, the safe driving control processing will be described with reference to the flowchart in FIG. 7.

In step S31, the operation planning unit 163 determines whether or not the current automatic driving level is the level 2. Then, in step S31, in a case where the current automatic driving level is the level 2, the processing proceeds to step S32.

In step S32, the operation planning unit 163 determines whether or not the currently traveling road is a road having a plurality of lanes on the basis of the vehicle peripheral information. In step S32, in a case where the currently traveling load is determined to be the road having a plurality of lanes, the processing proceeds to step S33.

In step S33, the operation planning unit 163 controls the communication unit 103 to acquire the information of the lanes of the currently traveling road from the cloud server or the like.

In step S34, the operation planning unit 163 calculates the risk evaluation value for each lane on the basis of the acquired lane information by, for example, the calculation expressed by the above expression (1).

In step S35, the operation planning unit 163 specifies the lane with the minimum risk evaluation value as the safest lane.

In step S36, the operation planning unit 163 determines whether or not the safest lane with the minimum risk evaluation value is the currently driving lane, and lane change is unnecessary. In step S36, in a case where the currently traveling lane does not have the minimum risk evaluation value, and the lane change is necessary, the processing proceeds to step S37.

In step S37, the operation planning unit 163 specifies the moving direction for changing the lane to the lane with the minimum risk evaluation value.

In step S38, the operation planning unit 163 controls the output control unit 105 to present, to the driver, the lane change for ensuring safety because the line-of-sight direction is not appropriate by an image and sound using the information display unit 252 and the speaker 253 of the output unit 106.

In step S39, the operation planning unit 163 notifies the operation control unit 135 of the moving direction for changing the lane to the lane with the minimum risk evaluation value. In the operation control unit 135, the direction control unit 173 of the vehicle control unit 211 controls the drive system control unit 107 to operate the drive system 108 to move the vehicle in the notified moving direction for changing the lane with the minimum risk evaluation value. As a result, the lane change to the lane with the minimum risk evaluation value is implemented.

Meanwhile, in step S31, in a case where the automatic driving level is not the level 2, the processing proceeds to step S40.

In step S40, the operation planning unit 163 determines whether or not the current automatic driving level is the level 1. In step S40, in a case where the automatic driving level is the level 1, the processing proceeds to step S41.

In step S41, the operation planning unit 163 controls the output control unit 105 to present, to the driver, the deceleration for ensuring safety because the line-of-sight direction is not appropriate by an image and sound using the information display unit 252 and the speaker 253 of the output unit 106.

In step S42, the operation planning unit 163 notifies the operation control unit 135 to reduce the current traveling speed by a predetermined rate. In the operation control unit 135, the acceleration and deceleration control unit 172 of the vehicle control unit 211 controls the drive system control unit 107 to operate the drive system 108 to reduce the notified current traveling speed by the predetermined rate. As a result, the current traveling speed can be reduced by the predetermined rate.

Furthermore, in step S40, in a case where the automatic driving level is not the level 1, that is, the automatic driving level is the level 0 and all the driving operations are controlled by the driver, the processing proceeds to step S43.

In step S43, the operation planning unit 163 controls the output control unit 105 to present, to the driver, the information for urging improvement to the appropriate direction because the line-of-sight direction is not appropriate by an image and sound using the information display unit 252 and the speaker 253 of the output unit 106.

Note that, in a case where the number of lanes of the currently traveling road is not plural in step S32, or in a case where the currently traveling lane is the lane with the minimum risk evaluation value and the lane change is unnecessary in step S36, the processing proceeds to step S41.

That is, in this case, the current traveling speed is reduced by the predetermined rate for ensuring safety.

By the above processing, in the situation where the line-of-sight direction is inappropriate and the inattentive driving or dozing driving is suspected, and in a case where the automatic driving level is the level 2, and the traveling road has a plurality of lanes, and the traveling lane is not the lane with the minimum risk evaluation value, the lane is changed to the lane with the minimum risk evaluation value.

By such processing, the risk evaluation value of the driving lane is reduced, and in the situation where the inattentive driving or dozing driving is suspected, the time to delay occurrence of an accident caused by the inattentive driving or dozing driving is secured and the damage level in the event of an accident can be reduced.

As a result, the safety can be improved even in the situation where the line-of-sight direction is inappropriate, and the inattentive driving or dozing driving is suspected.

Furthermore, in the situation where the line-of-sight direction is inappropriate and the inattentive driving or dozing driving is suspected, and in a case where the automatic driving level is the level 2, and the traveling road does not have a plurality of lanes or the vehicle is traveling on the lane with the minimum risk evaluation value, and moreover, when the automatic driving level is the level 1, the current traveling speed is reduced by the predetermined rate.

By such processing, in the situation where the line-of-sight direction is inappropriate, and the inattentive driving or dozing driving is suspected, the time to delay occurrence of an accident caused by the inattentive driving or dozing driving is secured and the damage level in the event of an accident can be reduced. Furthermore, in a case where the line-of-sight direction is inappropriate, and the situation where the inattentive driving or dozing driving is suspected continues, the speed is gradually reduced, whereby the safety can be further ensured.

Note that, in a case where the state where the line-of-sight direction is inappropriate continues by gradually reducing the speed, the vehicle 11 may be eventually stopped. Furthermore, in the case of stopping the vehicle, and in the case of the automatic driving level 2 and the direction can be controlled, the vehicle may be controlled to be stopped at a safe place on the shoulder.

As a result, the safety can be improved even in the situation where the line-of-sight direction is inappropriate, and the inattentive driving or dozing driving is suspected.

Moreover, in both the case of performing the lane change and the case of performing the deceleration in the safe driving control processing, the driving control is performed after the information notifying that the lane change or deceleration will be performed is presented in advance. For this reason, in a case where the driver awakens immediately before the control operation by the safe driving control processing is performed, the driver can be prevented from making a mistake due to a sudden lane change or deceleration and doing careless driving operation.

Furthermore, even in a case where the automatic driving level is the level 0 in the situation where the line-of-sight direction is inappropriate, and the inattentive driving or dozing driving is suspected, the information for urging the line-of-sight direction to be directed to the appropriate direction is continuously presented by images and sound although the driving control such as the lane change or the deceleration cannot be performed.

As a result, the safety can be improved even in the situation where the line-of-sight direction is inappropriate, and the inattentive driving or dozing driving is suspected.

6. Example of Execution by Software

By the way, the above-described series of processing can be executed by hardware or software. In a case where the series of processing is executed by software, a program constituting the software is installed from a recording medium into a computer incorporated in special hardware, a general-purpose computer capable of executing various functions by installing various programs, or the like.

FIG. 8 illustrates a configuration example of a general-purpose computer. The computer incorporates a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse for a user to input operation commands, an output unit 1007 that outputs a processing operation screen and an image of a processing result to a display device, a storage unit 1008 including a hard disk drive for storing programs and various data, and a communication unit 1009 including a local area network (LAN) adapter and the like and which executes communication processing via a network typified by the Internet are connected. Furthermore, a drive 1010 that reads and writes data with respect to a removable recording medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory is connected to the input/output interface 1005.

The CPU 1001 executes various types of processing according to a program stored in the ROM 1002 or a program read from the removable recording medium 1011 such as a magnetic disk, an optical disk, a magneto-optical disk, or a semiconductor memory, installed in the storage unit 1008, and loaded from the storage unit 1008 to the RAM 1003. Furthermore, the RAM 1003 appropriately stores data and the like necessary for the CPU 1001 to execute the various types of processing.

In the computer configured as described above, the CPU 1001, for example, loads the program stored in the storage unit 1008 into the RAM 1003 and executes the program via the input/output interface 1005 and the bus 1004, whereby the above-described series of processing is performed.

The program to be executed by the computer (CPU 1001) can be recorded on the removable recording medium 1011 as a package medium or the like, for example, and provided. Furthermore, the program can be provided via a wired or wireless transmission medium such as a local area network, the Internet, or digital satellite broadcast.

In the computer, the program can be installed to the storage unit 1008 via the input/output interface 1005 by attaching the removable recording medium 1011 to the drive 1010. Furthermore, the program can be received by the communication unit 1009 via a wired or wireless transmission medium and installed in the storage unit 1008. Other than the above method, the program can be installed in the ROM 1002 or the storage unit 1008 in advance.

Note that the program executed by the computer may be a program processed in chronological order according to the order described in the present specification or may be a program executed in parallel or at necessary timing such as when a call is made.

Note that the CPU 1001 in FIG. 8 implements the function of the automatic driving control unit 112 in FIG. 5. Furthermore, the storage unit 1008 in FIG. 8 implements the storage unit 111 in FIG. 5.

Furthermore, in the present specification, the term "system" means a group of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Note that the embodiments of the present disclosure are not limited to the above-described embodiments, and various modifications can be made without departing from the gist of the present disclosure.

For example, the present disclosure can adopt a configuration of cloud computing in which one function is shared and processed in cooperation by a plurality of devices via a network.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can have the following configurations.

<1> An information processing apparatus including:
a line-of-sight direction detection unit configured to detect a line-of-sight direction of a driver of a vehicle; and
an operation control unit configured to control the vehicle to a safe state in a case where the line-of-sight direction is not a safe line-of-sight direction that is a direction the driver should face during driving.

<2> The information processing apparatus according to <1>, further including:
a line-of-sight direction determination unit configured to determine whether or not the line-of-sight direction detected by the line-of-sight direction detection unit is the safe line-of-sight direction for a driving state of the vehicle recognized on the basis of vehicle peripheral information that is information around the vehicle.

<3> The information processing apparatus according to <2>, in which,
in a case where traveling straight is recognized as the driving state of the vehicle, the line-of-sight direction determination unit determines whether or not the line-of-sight direction is the safe line-of-sight direction according to whether or not the line-of-sight direction is front ahead.

<4> The information processing apparatus according to <2>, in which,
in a case where presence of a pedestrian or an oncoming vehicle in surroundings is recognized as the driving state of the vehicle, the line-of-sight direction determination unit determines whether or not the line-of-sight direction is the safe line-of-sight direction according to whether or not the line-of-sight direction is directed to the pedestrian or the oncoming vehicle.

<5> The information processing apparatus according to <2>, in which,
in a case where lane change or right or left turn is recognized as the driving state of the vehicle, the line-of-sight direction determination unit determines whether or not the line-of-sight direction is the safe line-of-sight direction according to whether or not the line-of-sight direction is changed and directed to a predetermined direction in a time series manner.

<6> The information processing apparatus according to <5>, in which,
in a case where lane change or right or left turn is recognized as the driving state of the vehicle, the line-of-sight direction determination unit determines whether or not the line-of-sight direction is the safe line-of-sight direction according to whether or not the line-of-sight direction is changed and directed to a direction of a rearview mirror, a direction of a door mirror, and a direction of a lane to change in a time series manner, or whether or not the line-of-sight direction is changed and directed to a direction to turn right or left in a time series manner.

<7> The information processing apparatus according to <1>, in which,
in a case where the line-of-sight direction is not the safe line-of-sight direction, the operation control unit controls the vehicle to a safe state according to an automatic driving level.

<8> The information processing apparatus according to <7>, in which,
in a case where the line-of-sight direction is not the safe line-of-sight direction, and when the automatic driving level is 2, the operation control unit controls the vehicle to a safe state by performing lane change to a safest lane in a plurality of lanes of a currently traveling road.

<9> The information processing apparatus according to <8>, in which the operation control unit calculates a risk evaluation value for each of the plurality of lanes of the currently traveling road, and controls the vehicle to a safe state by performing the lane change to a lane with the minimum risk evaluation value.

<10> The information processing apparatus according to <9>, in which the operation control unit controls the vehicle to a safe state by reducing a traveling speed when a currently traveling lane is the lane with the minimum risk evaluation value.

<11> The information processing apparatus according to <7>, in which,
in a case where the line-of-sight direction is not the safe line-of-sight direction, and when the automatic driving level is 2, and a currently traveling road does not have a plurality of lanes or a legal speed of the currently traveling road is lower than a predetermined speed, the operation control unit controls the vehicle to a safe state by reducing a traveling speed.

<12> The information processing apparatus according to <8>, in which,
in a case where the line-of-sight direction is not the safe line-of-sight direction, and when the automatic driving level is 2, the operation control unit controls the vehicle to a safe state by performing the lane change to the safest lane in a plurality of lanes of a currently traveling road, after presenting, to the driver, the performing the lane change to the safest lane in a plurality of lanes of a currently traveling road.

<13> The information processing apparatus according to <7>, in which,
in a case where the line-of-sight direction is not the safe line-of-sight direction, and when the automatic driving level is 1, the operation control unit controls the vehicle to a safe state by reducing a traveling speed.

<14> The information processing apparatus according to <13>, in which,
in a case where the line-of-sight direction is not the safe line-of-sight direction, and when the automatic driving level is 1, the operation control unit controls the vehicle to a safe state by reducing the traveling speed after presenting reduction of the traveling speed to the driver.

<15> The information processing apparatus according to <7>, in which,
in a case where the line-of-sight direction is not the safe line-of-sight direction, and when the automatic driving level is 0, the operation control unit controls the vehicle to a safe state by presenting, to the driver, information that urges the driver to direct the line-of-sight direction to an appropriate direction.

<16> The information processing apparatus according to <2>, in which,
in a case where the line-of-sight direction is not the safe line-of-sight direction, the line-of-sight direction determination unit determines that the line-of-sight direction is not the safe line-of-sight direction after presenting, to the driver, information that urges the driver to direct the line-of-sight direction to the safe line-of-sight direction, and when the line-of-sight direction detected by the line-of-sight direction detection unit is not the safe line-of-sight direction again.

<17> The information processing apparatus according to <16>, in which the presenting, to the driver, information that urges the driver to direct the line-of-sight direction to the safe line-of-sight direction is at least one of displaying the information as an image on a display unit, outputting the information as sound from a speaker, generating an irritating odor, causing the driver to have a conversation, vibrating a seat belt, vibrating a steering wheel, or vibrating a seat.

<18> The information processing apparatus according to <1>, in which the line-of-sight direction detection unit specifies a position of a pupil of the driver from an image of a vicinity of a face of the driver and detects the line-of-sight direction of the driver on the basis of the specified position of the pupil.

<19> An information processing method including:
line-of-sight direction detection processing of detecting a line-of-sight direction of a driver of a vehicle; and
operation control processing of controlling the vehicle to a safe state in a case where the line-of-sight direction is not a safe line-of-sight direction that is a direction the driver should face during driving.

<20> A program for causing a computer to function as:
a line-of-sight direction detection unit configured to detect a line-of-sight direction of a driver of a vehicle; and
an operation control unit configured to control the vehicle to a safe state in a case where the line-of-sight direction is not a safe line-of-sight direction that is a direction the driver should face during driving.

REFERENCE SIGNS LIST

91 Vehicle
100 Vehicle control system
102 Data acquisition unit
112 Automatic driving control unit
133 Situation analysis unit
134 Planning unit
135 Operation control unit
153 Situation recognition unit
154 Situation prediction unit
172 Acceleration and deceleration control unit
173 Direction control unit
201 Vehicle interior environment recognition unit
202 Feedback control unit
203 E-call
211 Vehicle control unit
231 In-vehicle sensor
251 Irritating odor generation unit
252 Information display unit
253 Speaker

The invention claimed is:

1. An information processing apparatus configured to control operations of a vehicle and comprising:
circuitry configured to:
detect one or more objects that are around the vehicle or that are around a moving path of the vehicle and generate corresponding vehicle peripheral information;
monitor a position of a pupil of a driver of the vehicle in order to detect a line-of-sight direction of the driver,
based on the vehicle peripheral information, determine that the detected line-of-sight direction does not correspond to a predetermined safe line-of-sight direction for a current driving state of the vehicle; and
change the current driving state of the vehicle to a predetermined safe driving state,
wherein the current driving state and the predetermined safe line-of-sight direction is one of a set of driving states and safe line-of-sight directions, the set of driving states and safe line-of-sight directions consisting of:
traveling straight on a road and a forward looking line-of-sight,
presence of a pedestrian or an oncoming vehicle and a line-of-sight directed to the pedestrian or the oncoming vehicle,
a lane change of the vehicle and a line-of-sight direction corresponding to the lane change, and
a right or left change of direction of the vehicle and a line-of-sight direction corresponding to the right or left change of direction, and
wherein predetermined safe driving state is each of a set of predetermined safe driving states that comprises:
an automatic lane change to a safest lane in a plurality of lanes of a currently traveling road that is determined by a risk evaluation calculation performed by the circuitry, and
an automatic reduction of speed of the vehicle.

2. The information processing apparatus according to claim 1, wherein,
the line-of-sight direction corresponding to the lane change is a direction toward a review mirror of the vehicle, and
the line-of-sight direction corresponding to the right or left change of direction is a direction toward a right or left door mirror of the vehicle corresponding to the right or left change of direction.

3. The information processing apparatus according to claim 1, wherein the automatic lane change is performed after providing an automatic lane change alert to the driver.

4. The information processing apparatus according to claim 3, wherein:
the set of predetermined safe driving states further comprises presenting an alert to the driver to change the detected line-of-sight direction to the predetermined safe line-of-sight direction, and
the alert to the driver to change the detected line-of-sight direction to the predetermined safe line-of-sight direction comprises one of a sound from a speaker, an odor, vibrating a seat belt, vibrating a steering wheel, or vibrating a seat.

5. The information processing apparatus according to claim 1, wherein the set of predetermined safe driving states further comprises presenting an alert to the driver to change the detected line-of-sight direction to the predetermined safe line-of-sight direction.

6. An information processing method for controlling a vehicle by a device, the method comprising:
- detecting one or more objects that are around the vehicle or that are around a moving path of the vehicle and generating corresponding vehicle peripheral information;
- monitoring a position of a pupil of a driver of the vehicle in order to detect a line-of-sight direction of the driver;
- based on the vehicle peripheral information, determining that the detected line-of-sight direction does not correspond to a predetermined safe line-of-sight direction for a current driving state of the vehicle; and
- changing the current driving state of the vehicle to a predetermined safe driving state,
- wherein the current driving state and the predetermined safe line-of-sight direction is one of a set of driving states and safe line-of-sight directions, the set of driving states and safe line-of-sight directions consisting of:
  - traveling straight on a road and a forward looking line-of-sight,
  - presence of a pedestrian or an oncoming vehicle and a line-of-sight directed to the pedestrian or the oncoming vehicle,
  - a lane change of the vehicle and a line-of-sight direction corresponding to the lane change, and
  - a right or left change of direction of the vehicle and a line-of-sight direction corresponding to the right or left change of direction, and
- wherein predetermined safe driving state is each of a set of predetermined safe driving states that comprises:
  - an automatic lane change to a safest lane in a plurality of lanes of a currently traveling road that is determined by a risk evaluation calculation performed by the circuitry, and
  - an automatic reduction of speed of the vehicle.

7. The information processing method according to claim 6, wherein the set of predetermined safe driving states further comprises presenting an alert to the driver to change the detected line-of-sight direction to the predetermined safe line-of-sight direction.

8. A non-transitory computer readable medium containing a program for causing a device to perform a method for controlling a vehicle, the method comprising:
- detecting one or more objects that are around the vehicle or that are around a moving path of the vehicle and generating corresponding vehicle peripheral information;
- monitoring a position of a pupil of a driver of the vehicle in order to detect a line-of-sight direction of the driver;
- based on the vehicle peripheral information, determining that the detected line-of-sight direction does not correspond to a predetermined safe line-of-sight direction for a current driving state of the vehicle; and
- changing the current driving state of the vehicle to a predetermined safe driving state,
- wherein the current driving state and the predetermined safe line-of-sight direction is one of a set of driving states and safe line-of-sight directions, the set of driving states and safe line-of-sight directions consisting of:
  - traveling straight on a road and a forward looking line-of-sight,
  - presence of a pedestrian or an oncoming vehicle and a line-of-sight directed to the pedestrian or the oncoming vehicle,
  - a lane change of the vehicle and a line-of-sight direction corresponding to the lane change, and
  - a right or left change of direction of the vehicle and a line-of-sight direction corresponding to the right or left change of direction, and
- wherein predetermined safe driving state is each of a set of predetermined safe driving states that comprises:
  - an automatic lane change to a safest lane in a plurality of lanes of a currently traveling road that is determined by a risk evaluation calculation performed by the circuitry, and
  - an automatic reduction of speed of the vehicle.

9. The non-transitory computer readable medium according to claim 8, wherein the set of predetermined safe driving states further comprises presenting an alert to the driver to change the detected line-of-sight direction to the predetermined safe line-of-sight direction.

* * * * *